United States Patent [19]
Anderson

[11] Patent Number: 5,397,382
[45] Date of Patent: Mar. 14, 1995

[54] BIO REGENERATING AIR FILTER

[75] Inventor: Wayne R. Anderson, Taylorsville, Miss.

[73] Assignee: Alliance Research and Manufacturing Corporation, North Palm Beach, Fla.

[21] Appl. No.: 139,262

[22] Filed: Oct. 18, 1993

[51] Int. Cl.[6] .................. B01D 53/04; B01D 47/14
[52] U.S. Cl. ............................... 96/135; 96/142; 55/233; 55/250; 55/274; 55/279; 55/467
[58] Field of Search ..................... 47/59, 63–66; 55/223, 233, 234, 248, 250, 259, 274, 279, 356, 360, 467, 471–473, 227; 96/121, 133, 135, 142

[56] References Cited

U.S. PATENT DOCUMENTS

| | | | |
|---|---|---|---|
| 3,999,329 | 12/1976 | Brais | 55/269 X |
| 4,016,677 | 4/1977 | Julinot | 47/64 |
| 4,421,534 | 12/1983 | Walker | 55/233 X |
| 4,662,900 | 5/1987 | Ottengraf | 55/223 X |
| 4,732,591 | 3/1988 | Tujisawa et al. | 96/135 |
| 4,734,111 | 3/1988 | Hoffmann et al. | 55/233 X |
| 4,806,148 | 2/1989 | Ottengraf | 55/233 X |
| 5,089,036 | 2/1992 | Hawes | 55/227 |
| 5,168,664 | 12/1992 | Deutschmann, Sr. | 47/59 X |
| 5,190,570 | 3/1993 | He | 55/385.2 X |
| 5,213,595 | 5/1993 | Kim | 55/472 X |

FOREIGN PATENT DOCUMENTS 0393408 10/1990 European Pat. Off. .

OTHER PUBLICATIONS

Alliance Research and Manufacturing Corporation drawing dated Mar. 26, 1990, marked No. FB-12-1 and entitled: "Twelve Inch Filter Planter".
Alliance Research and Manufacturing Corporation brochure entitled: "Nature's Air Filter".
Alliance Research and Manufacturing Corporation drawings dated Mar. 26, 1990 and Mar. 18, 1991 marked AF-1200 and AF-1201 and an undated drawing of a twelve inch filter planter base entitled FP-12-2.

*Primary Examiner*—Robert Spitzer
*Attorney, Agent, or Firm*—Lee, Mann, Smith, McWilliams, Sweeney & Ohlson

[57] ABSTRACT

A bio regeneration air filter having a pot for holding a filtering media and plant. The filtering media traps contaminates from air circulated therethrough and microorganisms associated with the root system break down the contaminates to convert them to plant food whereby the filtering media regenerates and need not be replaced. Air intake tubes draw air to or force air through the filtering media and communicate with a motor driven fan located in a base assembly which is removable from the pot. The fan can push air upwardly through air intake tubes, or reversely, draw air downwardly through the air intake tubes, whereby in either direction to bring ambient indoor air through the filtering media for bio regeneration filtering to occur. The pot may have an integrally formed air chamber for the air intake tubes or the system may include a separate air pan assembly forming a chamber below the pot and between the pot and the fan in the base.

33 Claims, 7 Drawing Sheets

BIO REGENERATING AIR FILTER

BACKGROUND OF THE INVENTION

The present invention is directed toward cleaning and filtering indoor air. The invention is more particularly directed to reducing harmful chemicals to greatly lowered levels, including eliminating cigarette smoke, pollen and unwanted odors. More specifically, the directed toward a self-cleaning air filter system using a bio regenerative principle wherein the filtering media does not need replacing.

Typical mechanical air filtering systems for filtering indoor ambient air pass the air through a filter media. Usually the medium consists of a mineral or electrostatic type filter, or other absorbent organic or inorganic fibrous mat. However, typically these filtering systems either need to be replaced, cleaned or disassembled after a period of use.

The present invention is directed toward a system does not require costly filter replacements as in conventional air cleaning systems. The present invention seeks to provide an improved means for using a recently developed concept in an efficient improved manner.

It is an object of the invention to provide an effective economical and ecologically desirable filtering mechanism that combines activated carbon and other filtering media known in the art with living plants and microorganisms which serve to reduce and eliminate odors and pollutants in the air.

It is a significant goal of the invention to improve upon prior bio regenerative systems which allowed for only one way airflow whereby to provide a filtering apparatus wherein the air to be filtered is drawn down through the filtering media or alternately may be forced upward through the media.

It is further a goal of the invention to utilize an adsorptive filtering material for trapping and holding indoor pollutants. In connection with this goal, it is further a goal of the invention to utilize the said currently developed concept whereby the plant roots and microorganisms living around roots of plant convert harmful pollutants into harmless food for the plant as would be understood by a biomechanical engineer or biologist.

It is a further goal of the invention to, upon the removal of odors, harmful chemicals and other airborne pollutants by the filtering media and plant roots, to return the filtered air in a clean form to the room.

It is also an allied goal of the invention to utilize the plant roots and microorganisms feeding off the trapped air pollutants to continuously clean the filtering media. In conjunction with this goal, it is desirable to provide an apparatus that allows for a plant to be grown hydroponically wherein no growing soil, or the like, is used for the plant and a filtering media is provided adjacent the root system.

Previous devices have attempted to use this bio regeneration concept but have had deficiencies in effectively achieving that goal.

It is therefore a goal of the invention to improve upon previous mechanisms using this principle.

It is yet another goal of the invention to improve upon prior bio regenerative types of systems by providing an apparatus wherein all the assembly to the base motor housing is done from the top. It is an allied goal to provide an improved plant pot that is not fastened onto the base and which may be easily removed or rotated.

It is yet still another related goal of the invention to provide the option of using a fiber filter for, or in addition to, an air screen for filtering larger particles and wherein this optional filter may be easily replaced separate from disturbing in any way the primary filtering media.

It is also a target of the invention to provide a safety screen in connection with an air disk over the base assembly to prevent someone from placing hands or fingers near the fan blade and conjunctively also to prevent debris and other unwanted particles from entering the motor housing.

SUMMARY OF THE INVENTION

The invention may be summarized as providing a filter apparatus utilizing the principles of bio regeneration with a living plant and a filter media whereby the filtering media need not be replaced and the airborne contaminates are trapped by the media where upon microorganisms living around the root systems of the associated plant, or plants, migrate to the filtering media to break down the contaminates and allow the plant root system to absorb them. In particular, one disclosed apparatus uses this known principle by providing a pot having an air intake or out-take system sealingly separated from the planting zone and having a downward opening hub-like manifold, or air chamber, for communicating with a sealed motor and housing.

The pot is separable from the motor and housing whereby to be movable or capable of changing position relative to the motor and housing without disconnection and without mechanical unfastening.

In this first form of the invention, an air disk is sealingly arranged centrally on the cover for the motor housing for air flow communication with the central hub-like manifold, or air chamber.

In a second form of the invention, the air intakes of the pot are individually open and are in communication with an air pan-like air chamber capable of sealing in a substantially airtight fashion underneath the pot and having therethrough a centrally open passageway opening to a lower motor housing having attached thereover an air screen cap and screen for safety purposes to keep articles or debris from entering the fan chamber and to protect one's fingers from coming into contact with any moving parts.

In both the first and second disclosed forms of the invention, the air intake tubes are integrally molded with the pot and are upwardly open into the filtering media and plant root system zone. In both forms the upper open ends of the intake tubes may be covered by an air intake ring to prevent water, dirt, debris or filter medium, from entering the tube. Optionally, the air intake ring may be replaced with air intake caps for individual attachment to each air intake tube.

In both disclosed forms of the invention, hydroponically grown plants may be used. In this regard, a hydroponic pot is insertable between air intake tubes for this type of planting. An optional fiber filter may be provided to be arranged around the passageway from the air chamber to the motor to provide additional filtering.

In all forms of the invention, reversible airflow can be obtained and accordingly the air may be drawn downwardly through the filtering media and plant system to be discharged through vents in the base, or alternatively, a reverse direction of the fan motor may be provided whereby to draw air upwardly through vents in the motor housing base to be forced upwardly through the air intake tubes and into the filtering media. In all embodiments, the air to be filtered is passed through the filtering media for the filtering the contaminates out.

DETAILED DESCRIPTION OF THE INVENTION

Reference will now be made to the FIGS. 1-7 wherein like reference numerals refer to the same elements throughout.

The Figures show a preferred embodiment, with alternate features and embodiments thereof, but are not intended as limitations to the invention with regard to the specific visualization made in these Figures.

Figure 1:
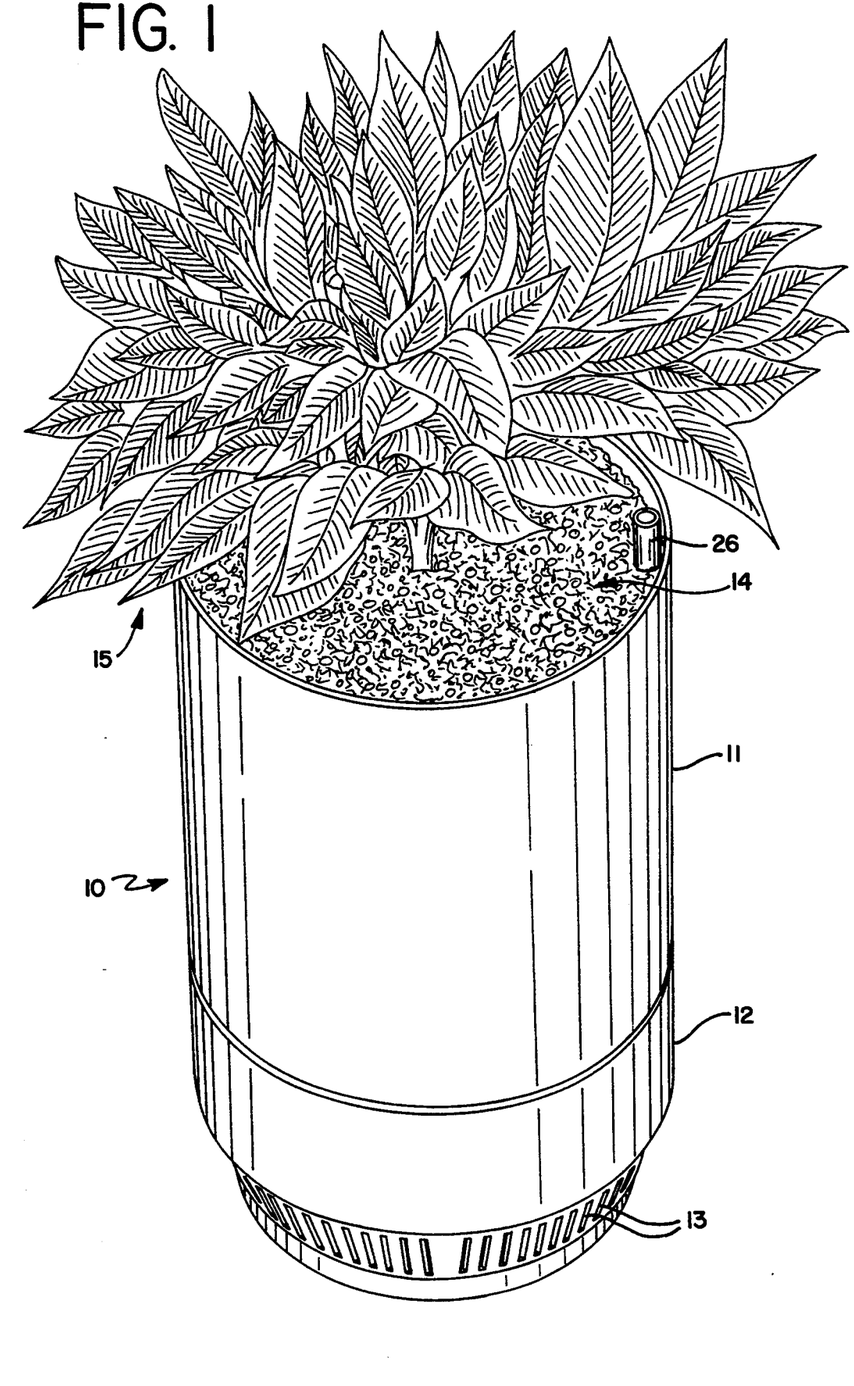
FIG. 1 is a perspective view of the outer configuration of the bio regeneration air filter and showing a plant growing in a pot supported above a motor and fan housing within a base.

FIG. 1 shows the exterior shell-like configuration of a bio regenerative air filter 10. The illustration of air filter 10 in FIG. 1 is in the fully assembled arrangement in use for providing indoor air pollution control. Broadly stated, the invention includes an upper pot 11 and lower base 12 having louvers or vents 13 for airflow around the bottom thereof. The pot 11 contains a filtering media 14 in which a plant 15 grows.

The base 12 will be later more fully explained to include a motor and housing for operating a fan to draw air either downwardly through the filtering media 14 to be expunged through the louvers 13, or in the reverse fashion, to be drawn upwardly through the louvers 13, through the apparatus and filtering media 14 to be returned in filtered form to the atmosphere, which occurs in both cases.

The concept of utilizing microorganisms which surround the root systems of a plant that grow in the media has undergone testing by the National Aeronautics and Space Administration (NASA) and employs well-known biological principles. The organisms that live around plant roots break down contaminates and pollutants that are trapped in the filtering media so that the plant can consume the contaminates as plant food thereby "eating" the material from the filming media and as a consequence, cleans the filtering media. This is called bio regeneration. It is important to the invention that this process can eliminate the need for replacing filters. Thus the air filter 10 is a very cost effective filtration system.

Recommended filtering media include activated carbon, zeolite and expanded clay in cooperation with certain types of living plants. Preferred species of plants for practice of the invention comprise: (a) for limited lighting areas, low light requiring plants, such as aglaonema (Chinese evergreen, golden evergreen, silver king evergreen), sansevieria (mother-in-law tongue), scindapsus(pathos) (golden pathos, satin pathos and marble queen), syngonium (arrowhead plant), and philodendron (heart leaf and red princess); (b) for low to medium light areas, aspidistra (caste iron plant), pepromia (emerald ripple), hedera helix (English ivory), spathiphyllum (peace lily); and (c) for medium light, chamaedorea (bamboo palm) and scheffiera (mini scheffiera). Other similar plants and root systems may also be used.

The pot 11 and base 12 are preferably made of a molded high impact durable plastic well-known to be used for potted plants, such as polypropylene, or ABS, as would be understood by one skilled in the art.

The invention allows for the extraction of potentially dangerous chemicals in building and dwelling air systems, thereby lowering the health risk to human beings by making these harmful chemicals present in reduced levels. The apparatus 10 also greatly reduces cigarette smoke, pollen and unwanted odors, including pet odors, cooking odors, ammonia odors and the like. Chemicals which are also extracted from the circulating air include formaldehyde, tricloralethane, benzine, carbon dioxide, carbon monoxide and other harmful chemicals.

As will be explained further below, the pot 11 and base 12 are fully separable allowing for a new plant to be placed in the pot 11 or for taking the pot 11 outside for repotting or even replacing with another similar pot 11 for disposition over the base 12. This would also be very useful in the event that any electrical or motor components within the base 12 would need to be repaired whereby the pot 11 does not have to be emptied or altered other than simply lifting it from the base 12.

The outer configuration for the pot 11 and base 12 can be maintained substantially identical for housing the embodiments shown in FIGS. 2-7 and for a wide range of equivalents falling within the scope of the invention. Changes to the heights of the pot 11 and base 12 are made in the two disclosed embodiments, which would of course change the line of separation in FIG. 1 between them.

Figure 2:
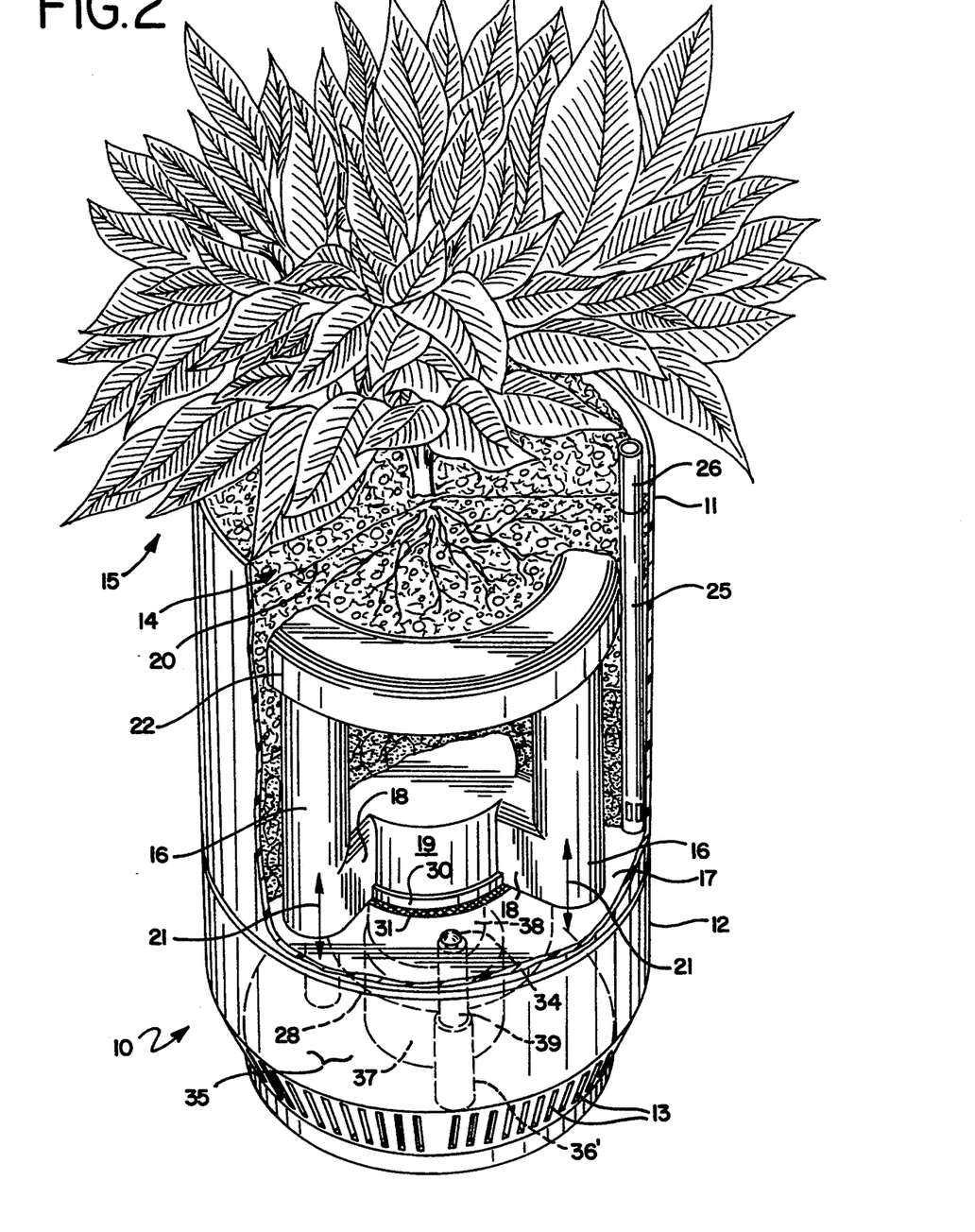
FIG. 2 is a perspective view as in FIG. 1 but with the exterior shell of the pot broken away to disclose the interior mechanical construction of a first embodiment of the invention.
Figure 3:
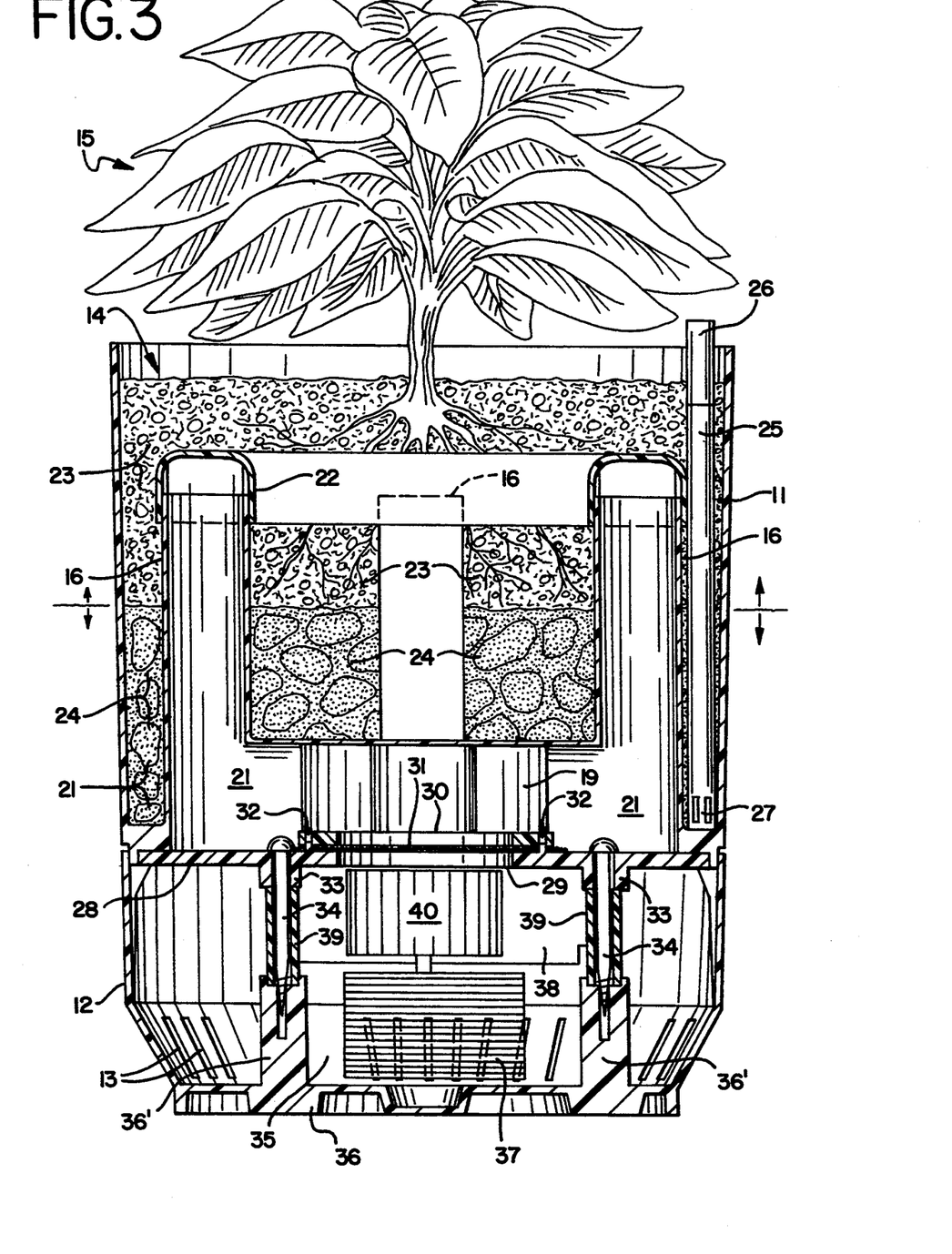
FIG. 3 is a central cross-sectional view of the apparatus as shown in FIG. 1 and showing the arrangement of the pot with air intake tubes feeding to a central hub-like air chamber and then to the motor and fan housing in the base therebelow.
Figure 4:
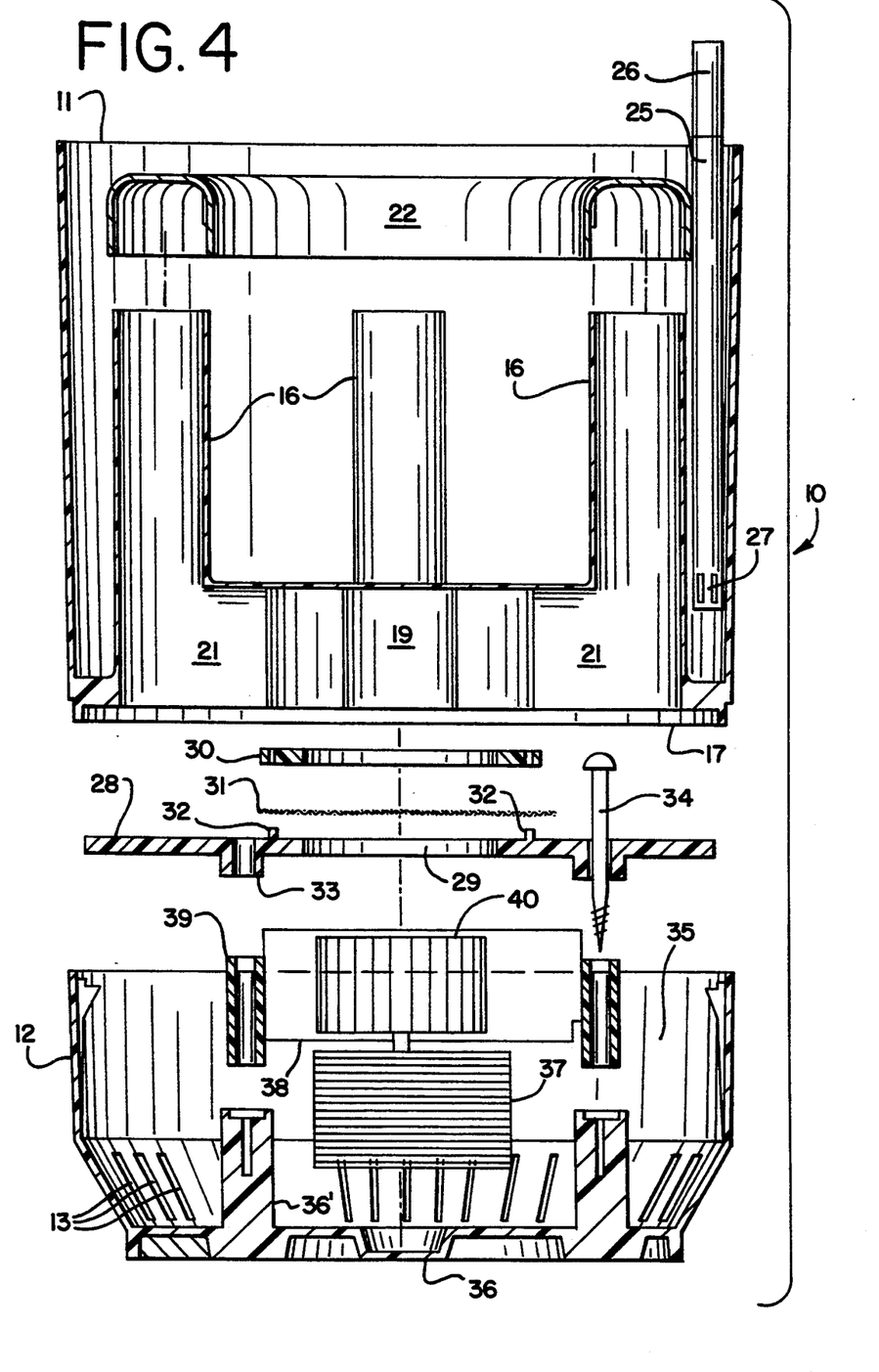
FIG. 4 is a cross-sectional view as shown in FIG. 3 but in an exploded arrangement to show the individual structural components.

Reference will now be made to FIGS. 2-4 wherein the more particular details of a first embodiment of the invention will be seen. The pot 11 is configured wherein to include four air intake tubes 16 which are molded into the bottom wall 17 of the pot 11 to prevent water from leaking into the base 12. The air intake tubes 16 are generally L-shaped and include shorter lower radial legs or passages 18 which are joined to a hub-like central manifold, or air chamber 19. The height of the central manifold 19 is approximately two inches in this embodiment and defines a 2" high reservoir zone of the water level preferred. This self-contained reservoir area is generally indicated by the lines and arrows denoted at 21 in FIG. 3.

A valuable function of the self-contained reservoir zone 21 also allows the pot 11 to be rotated relative to the base 12 so that even plant growth may take place, which is often needed when a plant begins to lean prominently toward the source of light. As stated above, the self-contained reservoir zone 21 also allows the pot 11 to be lifted from the base 12 and used as a typical pot for a plant that may be taken outside. The invention allows for the care of the plant needing to take electrical components outside or along with the pot 11 to other locations. Similarly, if there are any malfunctions or problems with the motor or electrical system within the base 12 (as will be further described below) the base 12 may be returned to the manufacturer for repair while allowing the plant to continue to grow in the pot 11.

Figure 5:
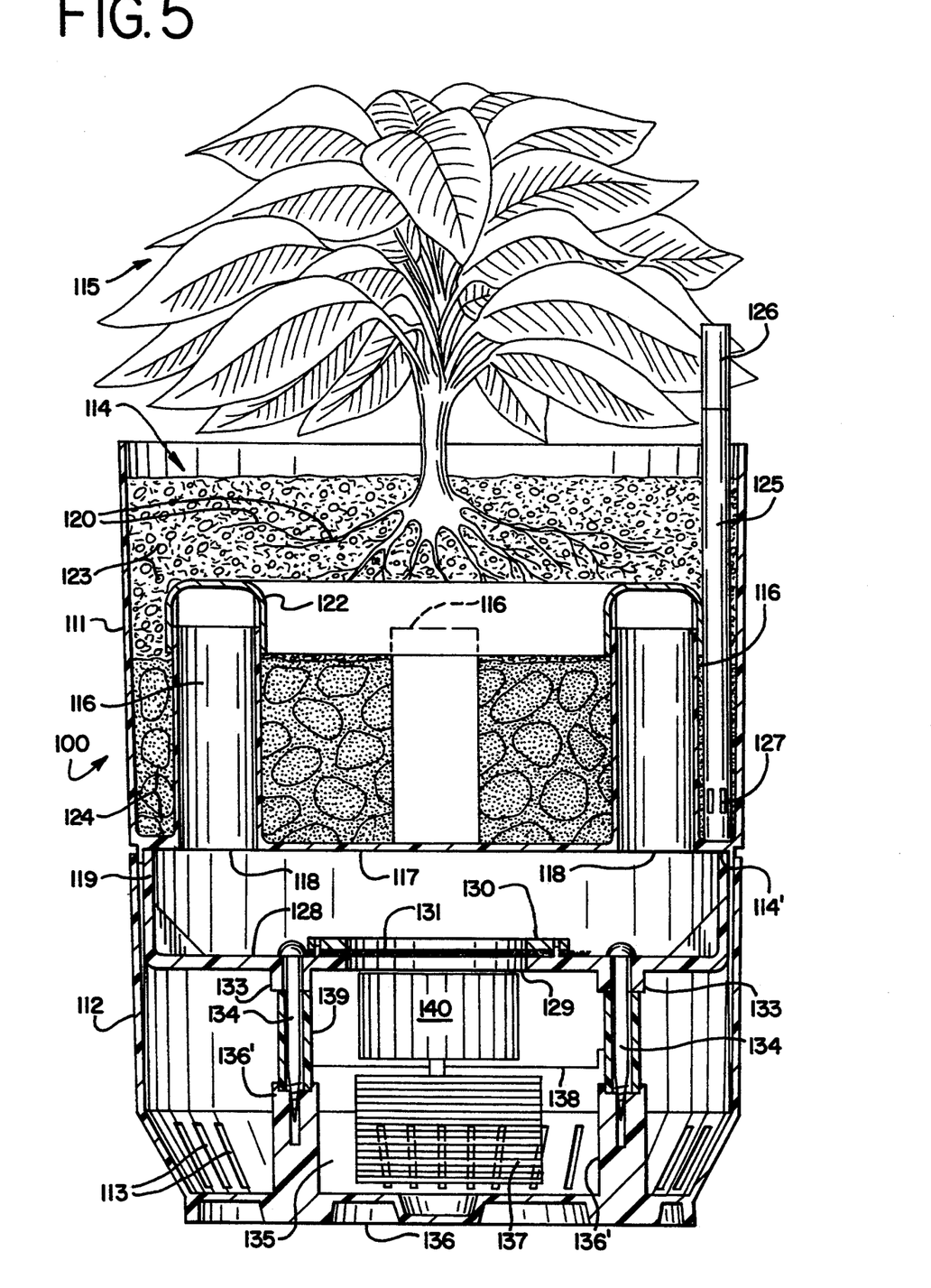
FIG. 5 is a cross-sectional view as in FIG. 3 but showing the second embodiment of the invention utilizing an air pan-like air chamber between the pot and the motor housing.
Figure 6:
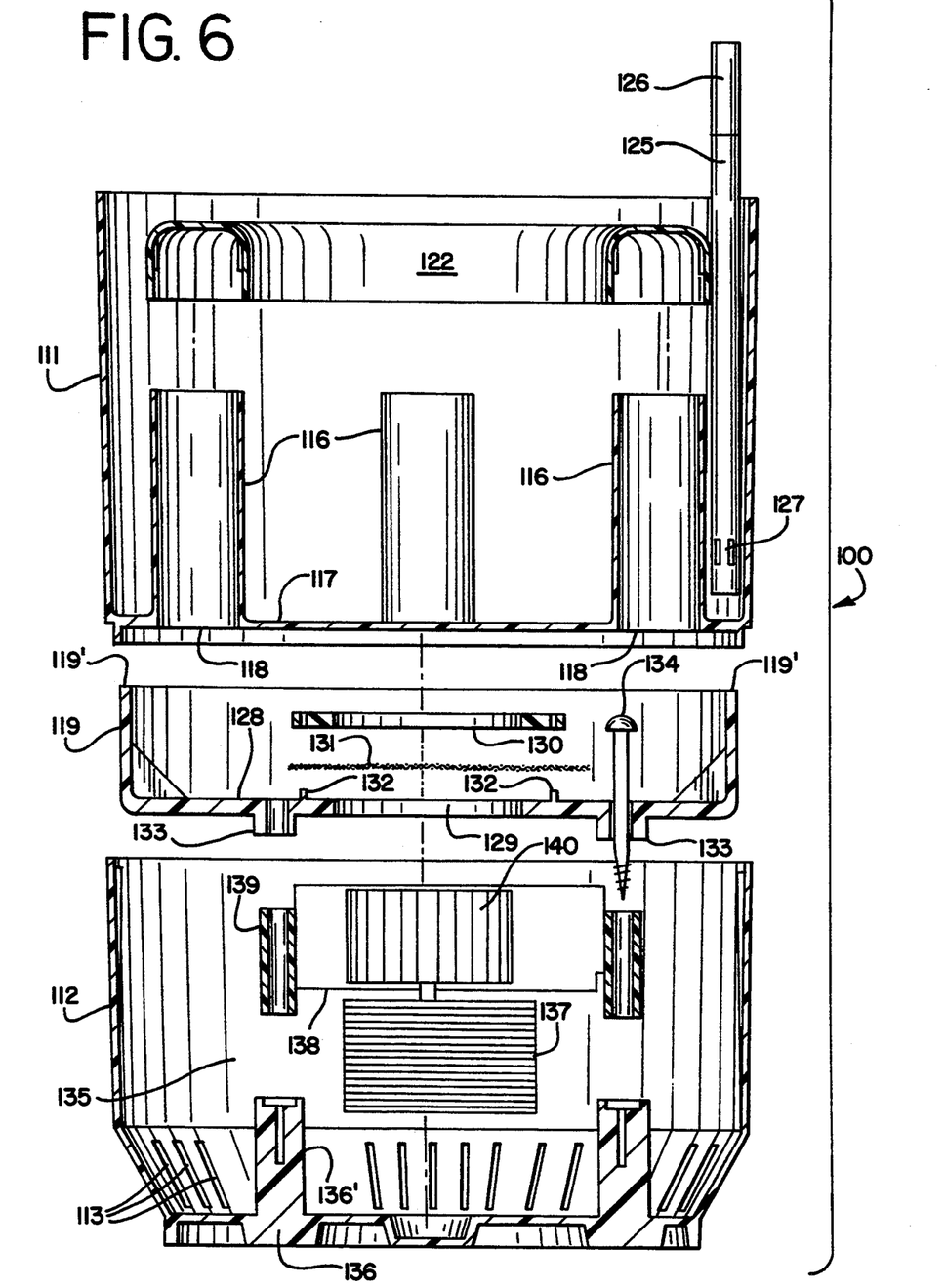
FIG. 6 is an exploded view of the embodiment of FIG. 5 similar to FIG. 4.

Both the embodiment for filter 10 in FIGS. 2-4, and the alternate embodiment as shown in FIGS. 5 and 6, allow for the use of a hydroponically grown plant to be inserted while still in a hydroponic receptacle inside the air filter 10 without modification to the pot 11 or air intake tubes 16. A more detailed explanation is provided below with respect to FIG. 7.

Resting atop the air intake tubes 16 is an air intake ring 22, which is depicted in cross-section in FIG. 3. The intake ring 22 is sized in relationship to the air intake tubes 16 in order to maximize airflow. The air intake ring 22 is secured to the intake tubes and raised above the air intake tubes 16 to provide for maximum airflow. The air intake ring 21 is located within the filtering media 14 and below the surface thereof which allows air to be pulled 360° around the ring from the filtering media 14 in the pot 11, thereby achieving effective filtration and maximum utilization of the filtering media 14 by virtue of permitting airflow circumferentially therearound. The air intake ring 22 also allows for the watering of the plant 15 without dirt or water falling into the air intake tubes 16, which could otherwise result in particles or moisture traveling into the base 12 and reaching the motor and base unit.

Alternately, instead of a circular configuration, a cap for each of the air intake tubes 16 could be provided, similar to putting a wind cap over a chimney and which would resemble in section, the cross-sectional view shown in FIG. 3 as would be clear, Of course the cap would be laterally open for permitting airflow into the air tubes 16.

The filtering media 14 in the preferred embodiment consists of an activated carbon and zeolite generally in the upper half of the pot 11 referenced at numeral 23 in the zone above the double-arrow reference line taken in the direction of the upward pointing arrows. The bottom half of the pot 11 contains expanded clay denoted at reference numeral 24. The activated carbon is used to adsorb odors, pollutants and chemicals from the air for purification. The zeolite in the media 23 is used to adsorb odors and other pollutants that activated carbon is not as effective in removing.

The expanded clay 24 is employed to filter out large particles and dust, as well as absorbing and holding moisture which is necessary for the plant 15 to grow. The filtering media portion of clay shown at 24 also acts like a wick to draw moisture from the water reservoir zone 21 upwardly to the plant roots 20. It will be further appreciated that the zone 21 extends radially between the air intake tubes 16 and the side of the pot 11. The reservoir zone 21 also may hold a portion of the clay 24 along the side of the pot 11, as illustrated in FIG. 2.

A tubular water gauge 25 is provided to indicate the water level in the pot 11. The lower end of the water gauge 25 extends between the air intake ring 22 and sidewall of the pot 11 and rests on the bottom 17 of the pot 11. The water gauge 25 includes a clear top cap 26. A floating indicator is placed within the tubular gauge 25 and may have a colored indicator top viewable through the clear cap 26 whereby it is visible as it moves up and down responsive to the water level changes within the pot 11. The perceptible level of an indicator within the cap 26 allows the person to know when water should be added and when the correct amount is reached. The lower end of the tubular gauge 26 has baffles 27 to keep debris and particles from entering and clogging the tube.

The pot 11 is cooperative with the base 12 by means of an air disk 28. The air disk 28 is a flat disk-like structure that is placed over the base 12. The disk 28 has a central aperture 29 to allow air to be pulled or pushed through it and is sized to provide for maximum airflow through the central air chamber 19. The air disk 28 resides beneath the bottom wall 17 of the pot 11 as shown in FIG. 2.

The central air chamber 19 and the air disk 28 are matingly arranged by the provision of an air screen cap 30 and a screen 31 that is sandwiched between the air screen cap 30 and the air disk 28 across the aperture 29. The air screen cap 30 and screen 31 are provided for the purpose of preventing debris and particles from being pulled into the base and to prevent anyone's fingers from entering into the base where the motor and fan reside as will be explained. The cap 30 is matable with the central air chamber 19. The screen 31 is placed over the aperture 29 on the air disk 28 and securely fastened by heat staking pins 32 that upwardly protrude from the air disk 28 through the screen 31 and into the air screen cap 30 in a tight secure relation. Also, resilient, snap-fitting pins could be used. When assembled, the central air chamber, or manifold, 19 rests atop the air screen cap 30 for air flow communication therethrough. A plurality of bosses 33 with bores therethrough extend downwardly from the air disk 28 for mechanical fastening, such as by the screw fasteners 34, to the base 12 as will be explained.

The base 12 includes a fan chamber 35 and a bottom wall 36 where upstanding lugs 36' in a number commensurate with the number of bosses 33, opposingly extend for the receipt of the screw fasteners 34. A motor 37 and housing 38 are arranged within the fan chamber 35 and include a plurality of sleeves or lugs 39 with bores therethrough for alignment with the lugs 33 and 36' allowing the screw fasteners 34 to fasten the air disk 28 securely to the base 12, as best viewed in FIG. 3.

The motor 37 is a single or multiple speed motor with a squirrel cage fan 40 mounted on the shaft of the motor within the housing 38 and aligned below the aperture 29 of the air disk 28. The motor may be reversible. When the air disk 28 is securely fastened to the base 12, the fan 40 will, depending on the fan direction, draw or push air through the aperture 29. Thereby, airflow through the louvers or vents 13 and air intake tubes 16 results. The central air chamber 19 is airtightly secured over the air screen cap 30 to prevent leakage whereby efficient airflow from the tubes 16 downwardly through the vents 13, or vice-versa, may occur by action of the motor and its associated fan 40.

The motor 37 is operable by the use of a typical electric cord and switch which may include a rocker switch, and rheostat, to allow for variable voltage, or an on/off switch depending upon the motor type and configuration.

Optionally the filter 10 may be provided with a timer built in, or housed with, the motor 37 and the fan chamber 35 to turn the system on or off at set times. In that regard, a photoelectric cell could also be installed for turning a motor on responsive to light. The filter 10 may also be provided with rollers or casters below for moving about in a room. Another option envisioned within the scope of the invention is the provision of a solar cell for operation of a DC motor instead of the AC motor 37.

It will be also observed that the assemblage of the base 12 relative to the pot 11 allows for all of the attachment to be done from above by virtue of the location of the screw fasteners 34 through the bosses 33, lugs 39 and lugs 36' as shown in the two locations depicted by the cross-sectional view of FIG. 2. This also accommodates the removability of the pot 11 from the base 12 for easy "from above" access to the motor 37 and housing 38 when electrical repair might be required.

Attention is now directed to FIGS. 5–6 wherein an alternate embodiment for the inventive air filter is shown.

FIGS. 5 and 6 show the alternate preferred embodiment for the invention comprising air filter apparatus 100. Air filter 100 utilizes the same bio regeneration principle as air filter 10, but provides a structure that has a separate air chamber that is not molded directly with the pot.

More specifically, the air filter 100 comprises a pot 111, base 112 with louvers or vents 113 at the bottom for air passage therethrough. The pot 111 contains a filtering media 114 which will be further described below. A plant 115 grows in the pot 111. It will be apparent that the pot 111 is shorter than the pot 11 of the first embodiment and wherein air intake tubes 116 are shorter than the air intake tubes 16 whereby the height of the pot is reduced. The air intake tubes 116 are molded into the bottom of the pot to prevent water from leaking to the base 112. As with air filter 10, the air filter 100 allows for the base and the pot to be separable and movable relative to each other. The air intake tubes 116 are molded integrally with a bottom wall 117 which is relatively a flat surface except for the openings of the air intake tubes 116. Accordingly, there are no L-shaped lower radial passageways conforming to 18 or a central hub-like air chamber, or manifold, 19 as shown for air filter 10. Rather, there are lower open ends 118 of the air intake tubes 116 that open into an air pan 119 which serves to function as an air chamber between the air intake tubes 116 and the base 112 similar to the air chamber 19. In this shortened configuration for the pot 111, there is no reservoir zone corresponding to the zone 21 for the air filter 10, although water can be maintained in the pot 111. However, the tops of the air intake tubes 116 are similarly submerged in the filtering media 114 and include, in the preferred embodiment, an air intake ring 122 which is substantially identical to the air intake ring 22 of air filter 10. Likewise, individual caps may be provided instead for each of the four air intake tubes 116. The air intake ring 122, or individual caps, prevent water and debris from entering the air intake tubes 116 and allows for a full 360° airflow path for the air to be pulled or pushed through the filtering media 114.

In one form of the invention, the filtering media 114 may include the same components as the filter media 14 whereby filtering media 123 will comprise activated carbon to adsorb odors, pollutants and chemicals to purify the air, and zeolite to adsorb odors and other pollutants that activated carbon is less effective at removing. The lower portion of the filter media 114 comprises an expanded clay zone 124. In this embodiment of the invention, the entire filtering media 114 could comprise the activated carbon and zeolite media 123 when hydroponically grown plants are used and a water level is not required to be maintained in a clay zone. Thus, the root system 120 of the plant 115 may, instead of residing in the filtering media 123, reside in a separable hydroponic pot as will be explained in connection with FIG. 7.

Although the pot 111 is smaller than the pot 11, a water content could be maintained in the clay zone 124 for growing a plant in the pot 111 similar to pot 11. Therefore, a tubular water gauge 125 is arranged similarly to the tubular water gauge 25 and includes a clear indicator cap 126 for observing a float indicator within the tube 125 and a lower end baffle 127 to keep particles and debris from entering the gauge 125 and clogging it.

Turning now to the means for airflow communication between the pot 111 and the base 112, it will be observed that the air pan 119 incorporates the functions of the air disk 28 and the central air chamber 19 of the embodiment of FIGS. 1–4. The air pan 119 is a generally pie pan-shaped structure and includes a bottom wall 128 which is constructed to reside within the base 112 not at the top like air disk 28. The base 112 is therefore taller than base 12 of the first embodiment in order to accommodate the height of the air pan 119 as shown in FIG. 5. The bottom wall 128 similarly includes a central air passage aperture 129 for communication between the air pan 119 and the base 112. An air screen cap 130 is attached to the bottom wall 128 at a screen 13 1 covering the aperture 129 by means of heat staking pins 132 that protrude from the bottom wall 128 up through the screen 131 into the cap 130. Also, snap-engaging resilient pins may be used. As best viewed in FIG. 6, the air pan 119 has an upper peripheral edge 119' which nests underneath the periphery of the bottom wall 117 in a close-fit—but separable—fashion whereby a relatively airtight arrangement of the pot 111 on the air pan 119 and the base 112 is achieved.

The base 112 is substantially the same as the base 12 in the first embodiment except for the height, as explained.

The bottom wall 128 of the air chamber 119 includes downwardly bored lugs 133 for the receipt therethrough of preferably screw fasteners 134. The base 112 has a fan chamber 135 and a solid bottom wall 136, substantially the same as wall 36 of the base 12. Similarly, upstanding lugs 136' are correspondingly aligned with the lugs 133 for attachment of the screw fasteners 134 as will be further explained.

The base 112 houses a motor 137 and associated blower or fan housing 138 formed with bored sleeves, or lugs, 139 for receipt of the screw fasteners 134 extending from lugs 133 therethrough to the upstanding lugs 136' for securement of the air pan 119 to the base 112. The housing 138 includes a squirrel cage type fan 140 mounted to the shaft of the motor 137 whereby to be in airflow communication through the aperture 129 of the bottom wall 128. As with the motor 37 of the embodiment for air filter 10, the motor 137 may be operated either to draw air downwardly from the air intake tubes 116 through aperture 129 and outwardly of the louvers 113, or alternately of the type to alternately draw air inwardly through the louvers 113, upwardly through aperture 129, air intake tubes 116 and then outwardly thereof into the air filtering media 123. In either direction of flow the air to be filtered is passed through the filtering media 114.

Because the air filter 100 may have a shorter pot and taller base than the air filter 10, it allows these parts (111,112) to be produced on the same size molding machine. The air filter 100 therefore does not have a pot height whereby to provide a zone corresponding to zone 21 of air filter 10 but water may be maintained in the pot. For use with hydroponically grown plants, the expanded clay zone 124 can be eliminated and the entire pot 111 filled with the filtering media 123. To manufacture and ship in a ready-to-use fashion, the elimination of the clay 124 reduces weight and shipping costs.

By replacing the air disk 28 with the air pan 119, the air filter 100 creates airflow from the air intake tubes 116 out of the pot 111 directly into the air pan 119 and then through the center aperture 129 in the bottom wall 128.

Figure 7:
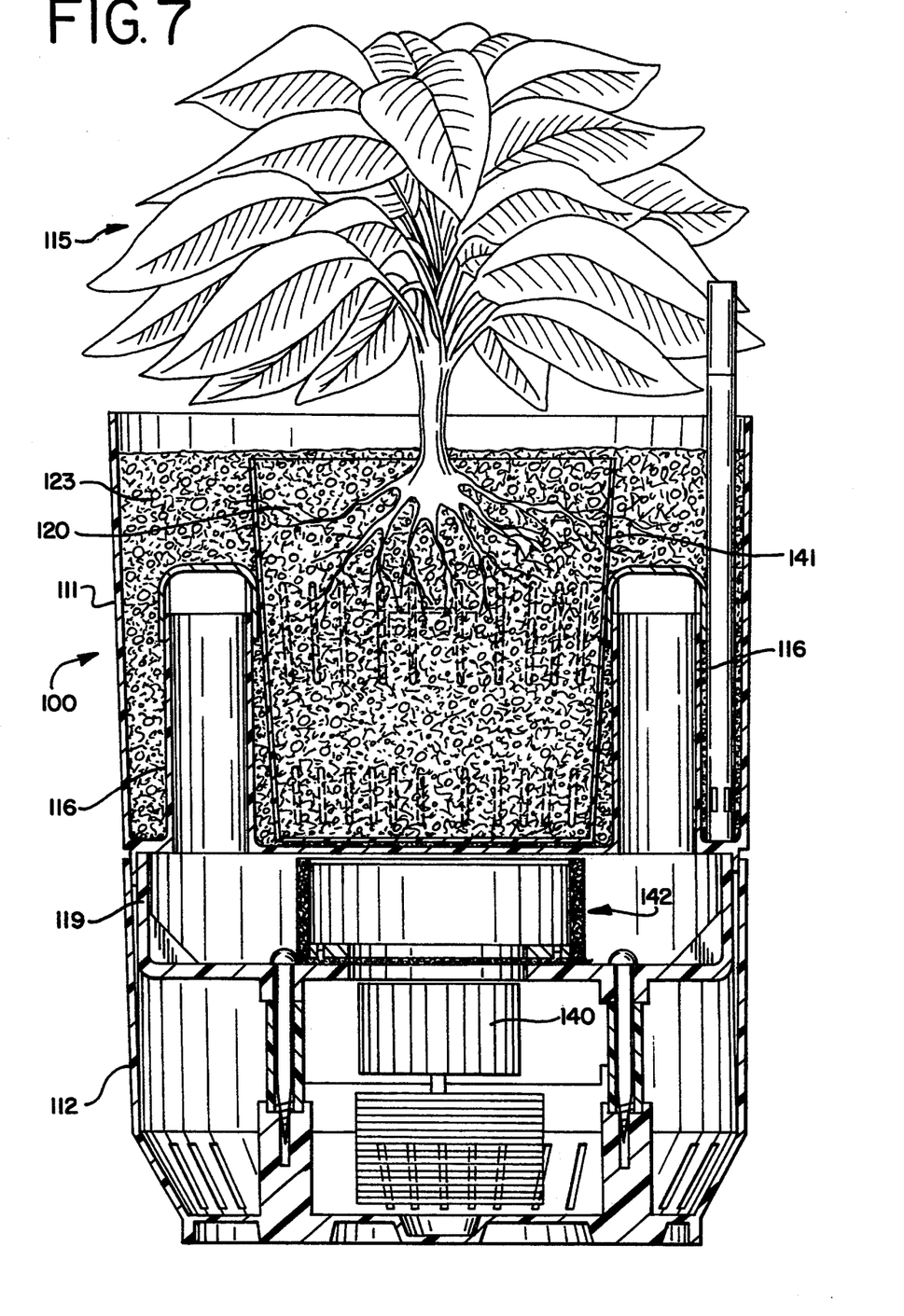
FIG. 7 is a cross-sectional view of the second embodiment as in FIG. 5 but further showing the optional inclusion of a hydroponic receptacle in the upper pot and the use of an optional fiber filter within the air pan-like air chamber.

Turning now to FIG. 7, alternate preferred variations to the air filter apparatus in accordance with the invention are disclosed. The air filter 100 includes a hydroponic receptacle 141 whereby the plant 115 does not have to be taken out of the receptacle 141 for placement into the pot 111 and may be grown independently in the hydroponic receptacle 141. The hydroponic receptacle 141 is sized to fit between the four intake tubes 116 within the pot 111. Of course, the root system 120 is in communication with the filtering media 123 to accomplish the bio regenerative effect utilized by the invention.

Optionally, an additional fiber filter 142, instead of screen 131, or in addition thereto, may be placed over and around the central aperture 129 to provide for filtering large particles and as a safety barrier to the fan 140. This filter 142 may be taken out, replaced or cleaned by simply lifting the pot 111 from the air pan 119.

It will therefore be appreciated that the pot 111 and air pan 119 are arranged in a separable and relatively movable relationship. The pot 111 rests atop the air pan 119 and the base 112 and may be rotated relative thereto to change plant positions or removed entirely for taking the pot 111 elsewhere. This allows taking a plant outside for sunlight and also permits repairing or replacing electrical apparatus within the base 112 from above.

The fiber filter 142 may also be installed within the hub-like air chamber 19 above the air screen cap 30 in the air filter 10. The pot 11 of air filter 10 would be lifted upwardly for replacement or cleaning of the filter 142. Again, the utilization of the fiber filter 142 can be in replacement of, or in addition to, the screen 31.

In both embodiments for the pot 11 and 111, the engagement with the respective bases 12 or 112, respectively may take the form of a bayonet-type joint, or simply kept in place by the weight of the pots and contents therein.

In the preferred embodiment for the motors 37 and 137, they are thermally protected and designed to produce 50 to 60 cubic feet of airflow per minute at maximum speed and 25 to 30 cubic feet of airflow per minute at normal speed.

The slots or louvers 13 and 113 in the bases 12 and 112, have as much or more open area as the apertures 29 or 129 in the air disk 28 or air pan 119, respectively. The air intake disk 28 and air pan 119 have the correct sized central apertures to allow for the same amount of square inches of free airflow as the total of the square area of airflow through the four intake tubes 16 and 116, respectively. In that regard also, the air rings 22 and 122 maximize airflow by being sized to provide the same square inches as the diameters of the air intake tubes 16, 116, respectively.

As a result, the invention provides an improved structure for efficiently employing the bio regenerative principle of trapping contaminates in a filtering media whereby the microorganisms associated with the root systems of the plants break them down and consume them as food.

While the invention has been described in connection with a preferred embodiment thereof, it will be understood that the scope of the invention is much broader and many equivalents fall within the range of the claims appended hereto.

What is claimed is:

1. A bio regeneration air filtering apparatus comprising:
 a pot for growing a plant, means for containing filtering, media, the pot formed integrally with at least one upstanding air intake tube having an upper open end and a lower open end communicating outwardly of the pot;
 means forming an aperture for passage of air to and from said pot and having means for mounting to a base member;
 a base having a chamber therein, said chamber including a motor and fan mounted therein, said fan communicating with said means forming an aperture whereby to cause airflow therethrough, said base including means forming vents therethrough for communicating airflow to or from the chamber, said base having a bottom wall and fastening means securing said means forming said aperture to said base independent of and remote from said base bottom wall;
 said pot being movable relative to and separable from said base and said means forming said aperture, and said pot being capable of resting upon said base in a substantially airtight manner whereby airflow may occur between said at least one air intake tube and said means forming vents in either inward or outward direction, and wherein said at least one air intake tube has said upper open end opening interiorly of said pot; and,
 a filtering media contained by said means for containing filtering media and extending to a height above said upper open end of said at least one air intake tube.

2. The apparatus as claimed in claim 1 wherein a plant has its root system in communication with said filtering media.

3. An apparatus as claimed in claim 1 wherein said pot further includes a central integrally formed air chamber communicating with said lower open end of said at least one air intake tube.

4. The apparatus as claimed in claim 3 wherein said air chamber downwardly opens to communicate with the means forming an aperture whereby airflow therebetween may occur.

5. The apparatus as claimed in claim 1 further including a screen and a screen cap securing said screen over said means forming an aperture and having an opening therethrough for permitting the passage of airflow from said air intake tubes to said chamber of said base.

6. The apparatus as claimed in claim 1 wherein in said pot further includes a water gauge.

7. The apparatus as claimed in claim 6 wherein said water gauge comprises an elongate tubular member extending upwardly to extend outwardly of the pot.

8. An apparatus as claimed in claim 1 wherein said filtering media comprises at least one of the following: activated carbon, zeolite or expanded clay.

9. The apparatus as claimed in claim 1 wherein said at least one air intake tube includes means for covering the upper open end to prevent moisture or solid particles from entering.

10. The apparatus as claimed in claim 1 wherein said pot has a lower zone thereof forming a means for maintaining a volume of water therein.

11. The apparatus as claimed in claim 1 wherein said means forming an aperture is formed in a bottom wall of an air pan member residing within said base and below said pot, wherein said lower open end of the at least one air intake tube communicates airflow therebetween and wherein said air pan member forms an air chamber for the passage of air between said chamber of the base and said pot, said air pan member being fastened to said base by said fastening means, wherein said pot is capable of removably resting upon said base and the air pan member.

12. The apparatus as claimed in claim 1 wherein said pot includes therein a receptacle for said plant and said plant root system thereof being in communication with said filtering media, said receptacle being removable therefrom.

13. The apparatus as claimed in claim 12 wherein said separable receptacle is a hydroponic-type pot for growing the plant hydroponically.

14. The apparatus as claimed in claim 1 further including a fibrous filter arranged at said means forming said aperture for filtering air passing between said chamber of the base and the said at least one air intake tube of the pot.

15. The apparatus as claimed in claim 1 wherein said at least one air intake tube comprises a plurality of air intake tubes.

16. The apparatus as claimed in claim 15 wherein said plurality of air intake tubes have their upper open ends communicating with a circular air intake ring extending around and interiorly of said pot for 360° whereby airflow may be drawn or directed 360° within the filtering media.

17. The apparatus as claimed in claim 1 wherein said motor and fan comprise an electric motor and a squirrel cage fan driven by the motor.

18. The apparatus as claimed in claim 1 wherein said pot is integrally molded plastic.

19. A bio regeneration air filter apparatus comprising:
a pot having means for holding filtering media and being formed with a plurality of air intake tubes, the air intake tubes having upper and lower open ends, said upper open ends opening into the means for holding filtering media, said lower open ends communicating with a central air chamber, the central air chamber integrally formed with the pot and having a pot-outwardly opening aperture for air flow passage therethrough and wherein said central air chamber and air intake tubes are water fight with respect to said means for holding filtering media, and means for covering the upper open ends of said air intake tubes whereby to permit air flow while preventing water and particles from entering therein;
a base comprising a chamber, a motor and fan assembly within said chamber, said fan being driven by said motor, a covering air disk member having an aperture therethrough for communicating with the central air chamber of said pot, means for mechanically fastening together said air disk member, the motor and fan assembly, and the base; the base further having a screen and securing cap, the securing cap securing said screen over said aperture and to said air disk member, wherein said pot is capable of being supportively rested atop said base for providing air passage communication between said central air chamber through said aperture of the air disk member into said chamber of the base; said base further including means forming vents for air passage to and from said chamber, said base having a bottom wall thereof, said means for mechanically fastening being independent of said bottom wall.

20. The bio regeneration air filter as claimed in claim 19 wherein said pot further includes a living plant growing therein with the root system thereof communicating with said means for holding filtering media.

21. The bio regeneration air filter apparatus as claimed in claim 19 wherein said pot includes at least one filtering medium held within said means for holding filtering media.

22. The bio regeneration air filter apparatus as claimed in claim 19 wherein said pot includes a tubular water gauge for indicating the level of water in the pot.

23. The bio regeneration air filter apparatus as claimed in claim 19 wherein a bottom zone of said pot generally around the central air chamber forms a water reservoir.

24. The bio regeneration air filter apparatus as claimed in claim 19 wherein the means for covering the upper open end of the air intake tubes comprises an air intake ring having a circular configuration.

25. The bio regeneration air filter apparatus as claimed in claim 19 wherein the means for holding filtering media contains filtering media consisting of at least one of the following: activated carbon, zeolite or expanded clay.

26. The bio regeneration air filter apparatus as claimed in claim 25 wherein the filtering media is of the type which do not have to be replaced or cleaned when used in combination with a living plant therein and wherein the filtering media are capable of trapping contaminates from the atmosphere whereby microorganisms on the plant root system break down the contaminates for making food for the plant.

27. The bio regeneration air filter apparatus as claimed in claim 19 wherein said pot is rotatably movable and completely separable from said base independently of said means for mechanically fastening, said pot being rested atop said base in a substantially airtight manner around said aperture of the air disk.

28. A bio regeneration air filter apparatus comprising a pot and separable base:
said pot having means for holding filtering media, the pot being integrally formed with a plurality of air intake tubes having open upper ends opening to the means for holding filtering media and lower open ends, the pot having a bottom wall, the lower open ends of the air intake tubes opening through the bottom wall of said pot, said pot being capable of retaining water for a plant and being watertight around said air intake tubes; and, a base including a fan, an air pan, a lower portion forming a chamber for the fan and an upper portion receiving the air pan, the base capable of supporting the pot thereon and over the air pan, said air pan and said pot capable of forming an air chamber for air passage from said air intake tubes, the air pan including a bottom wall having an aperture therethrough communicating with the chamber for the fan, mechanical fastening means extending from said air pan to engage means for receiving the fasteners formed in said base, said base including a bottom wall, said means for receiving the fasteners extending from said bottom wall, air vents opening to said chamber for the fan whereby air passage may occur between said air vents and said air intake tubes, said air pan further including means for receiving a screen filtering assembly at said aperture, said bottom wall of said pot being spaced from the bottom wall of said air pan forming said air chamber therebetween upon resting the pot on the base.

29. The bio regeneration air filter apparatus as claimed in claim 28 wherein said plurality of air intake tubes having means for covering the open upper ends for preventing moisture and debris from therein.

30. The bio regeneration air filter apparatus as claimed in claim 28 wherein said pot further includes a tubular water gauge for indicating the level of water within said pot.

31. The bio regeneration air filter apparatus as claimed in claim 28 wherein said pot further include means for holding a separable plant receptacle containing a plant and root system therein.

32. The bio regeneration air filter apparatus as claimed in claim 28 wherein said means for holding filtering media holds a filtering media comprising at least one of the following: activated carbon, zeolite or expanded clay.

33. The bio regeneration air filter apparatus as claimed in claim 28 wherein a screen and screen cap are arranged at the aperture of said bottom wall of the air pan and said screen extending across said aperture.

* * * * *